United States Patent
Chhaunker et al.

(10) Patent No.: US 8,676,275 B2
(45) Date of Patent: *Mar. 18, 2014

(54) AMBIENT SOUND-BASED CALL FUNCTIONS

(75) Inventors: Gaurav Chhaunker, Hyderabad (IN);
John G. Musial, Newburgh, NY (US);
Sandeep R. Patil, Pune (IN); Husein Shamshudin, Kingston (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,501

(22) Filed: Aug. 27, 2012

(65) Prior Publication Data

US 2014/0051405 A1 Feb. 20, 2014

Related U.S. Application Data

(63) Continuation of application No. 13/589,783, filed on Aug. 20, 2012.

(51) Int. Cl.
*H04M 1/00* (2006.01)
*H04M 3/42* (2006.01)
*H04M 3/00* (2006.01)
*H04M 13/00* (2006.01)
*H04W 4/00* (2009.01)

(52) U.S. Cl.
USPC ........ 455/567; 455/413; 455/414.1; 455/415; 455/466; 455/550.1; 379/418; 379/179; 379/252; 379/373.01

(58) Field of Classification Search
USPC .............. 455/567, 413, 414.1, 415, 466, 550; 379/418, 179, 252, 373.01–373.04
See application file for complete search history.

(56) References Cited

U.S. PATENT DOCUMENTS

| 6,018,668 | A  | 1/2000  | Schmidt |
| 6,834,107 | B1 | 12/2004 | Hurst |
| 7,085,253 | B2 | 8/2006  | Yang |
| 7,142,894 | B2 | 11/2006 | Ichikawa et al. |

(Continued)

FOREIGN PATENT DOCUMENTS

| JP | 2000188781 | 7/2000 |
| JP | 2000196739 | 7/2000 |
| TW | 200930019  | 7/2009 |

OTHER PUBLICATIONS

Sameed, "Auto Reply to Text Messages & Incoming Calls on Your Android Phone", [Retrieved Aug. 20, 2012, http://www.addictivetips.com/mobile/auto-reply-to-text-messages-incoming-calls-on-your-android-phone/] pp. 1-4, (2011).

(Continued)

*Primary Examiner* — Jinsong Hu
*Assistant Examiner* — Dung Hong
(74) *Attorney, Agent, or Firm* — Cantor Colburn LLP; Louis Percello

(57) ABSTRACT

Ambient sound-based call functions include calculating, via a computer processor on a mobile communications device, a decibel level of ambient noise. In response to receiving an incoming call from a calling device, and prior to activating a ringtone on the mobile communications device, the ambient sound-based call functions include determining that the decibel level exceeds a threshold value, and sending an automated response to the calling device in lieu of connecting the call to the mobile communications device.

15 Claims, 4 Drawing Sheets

(56) References Cited

U.S. PATENT DOCUMENTS

| | | | |
|---|---|---|---|
| 7,184,521 | B2 | 2/2007 | Sikora et al. |
| 7,675,411 | B1* | 3/2010 | Michaelis et al. ....... 340/539.12 |
| 2001/0027378 | A1* | 10/2001 | Tennison et al. ............. 701/213 |
| 2002/0086656 | A1 | 7/2002 | Mattisson |
| 2004/0082317 | A1* | 4/2004 | Graefen ........................ 455/413 |
| 2004/0127198 | A1 | 7/2004 | Roskind et al. |
| 2005/0136842 | A1 | 6/2005 | Fan et al. |
| 2005/0282590 | A1* | 12/2005 | Haparnas ...................... 455/570 |
| 2006/0105786 | A1 | 5/2006 | Urquhart |
| 2006/0116175 | A1 | 6/2006 | Chu |
| 2006/0217159 | A1* | 9/2006 | Watson ......................... 455/563 |
| 2006/0258378 | A1 | 11/2006 | Kaikuranata |
| 2007/0032225 | A1 | 2/2007 | Konicek et al. |
| 2007/0135103 | A1* | 6/2007 | Middleton ................. 455/414.1 |
| 2008/0170683 | A1 | 7/2008 | Zernovizky et al. |
| 2011/0077033 | A1 | 3/2011 | Shuai |
| 2011/0151838 | A1 | 6/2011 | Olincy et al. |
| 2011/0165861 | A1* | 7/2011 | Wilson et al. ................. 455/411 |
| 2012/0064924 | A1* | 3/2012 | Schapsis et al. ............. 455/466 |
| 2012/0250517 | A1* | 10/2012 | Saarimaki et al. ............ 370/241 |

OTHER PUBLICATIONS

Spradlin, "Quick Look—RingDimmer Automatically Adjusts Ringtone Volume Based on Ambient Sound, Saves Users From Embarrassing Disruptions" [Retrieved Aug. 20, 2012, http://www.androidpolice.com/2012/01/23/quick-look-ringdimmer-automatically-adjusts-ringtone-volume-based-on-ambient-sound-saves-users-from-embarrassing-disruptions/], pp. 1-15 (2012).

IBM, "Method and System for Automatically Answering an Incoming Call on a Mobile Phone", IPCOM000191772D, http://www.ip.com/pubview/IPCOM000191772D; pp. 1-2 (Jan. 2010).

Mitchell, "Mobile Apps—Adjust Your Ring Volume For Ambient Noise", [Retrieved Aug. 20, 2012, http://msdn.microsoft.com/en-us/magazine/cc163341.aspx] pp. 1-9, (Copyright 2012).

Automatic Volume Control, Starmark Incorporated, online [Retrieved Aug. 20, 2012, http://starmarktechnologies.com/Automatic-Volume-Control/index.html], pp. 1-2 (Starmark Incorporated founded 1987).

* cited by examiner

AMBIENT SOUND-BASED CALL FUNCTIONS

CROSS-REFERENCE TO RELATED APPLICATION

This application is a continuation of U.S. patent application Ser. No. 13/589,783, filed Aug. 20, 2012, the disclosure of which is incorporated by reference herein in its entirety.

BACKGROUND

The present invention relates to mobile communications and, more specifically, to ambient sound-based call functions for mobile communications devices.

One of the main conveniences of mobile communications devices is the ability to stay connected while on the go. Many individuals greatly rely on the ability to be in communication with others at virtually any time of the day and at any location. Oftentimes, however, individuals find themselves in physical locations in which noise levels are exceptionally high. When an incoming call is received during this type of situation, the individual has the option to either ignore the call or attempt to conduct the communication over the noise levels. Competing with such a distraction can result in confusion, misinformation, and frustration for both parties to the communication.

SUMMARY

According to an embodiment of the present invention, a method is provided. The method includes calculating, via a computer processor on a mobile communications device, a decibel level of ambient noise. In response to receiving an incoming call from a calling device, and prior to activating a ringtone on the mobile communications device, the method includes determining that the decibel level exceeds a threshold value, and sending an automated response to the calling device in lieu of connecting the call to the mobile communications device.

According to a further embodiment of the present invention, a computer program product is provided. The computer program product includes a computer-readable storage medium having instructions embodied thereon, which when executed by a computer, cause the computer to implement a method. The method includes calculating a decibel level of ambient noise. In response to receiving an incoming call from a calling device, and prior to activating a ringtone on the mobile communications device, the method includes determining that the decibel level exceeds a threshold value, and sending an automated response to the calling device in lieu of connecting the call to the mobile communications device.

According to another embodiment of the present invention, a method is provided. The method includes calculating, via a computer processor on a mobile communications device, a decibel level of ambient noise. In response to receiving an incoming call from a calling device, the method includes determining that the decibel level exceeds a threshold value, and performing a function corresponding to user-defined settings indicative of a mode of operation.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

According to an exemplary embodiment, ambient sound-based call functions for mobile communications devices are provided. When an incoming call is received by an individual at a time when noise levels surrounding the individual are exceptionally high, the individual has the option to either ignore the call or attempt to conduct the communication over the noise levels. Competing with such a distraction can result in confusion, misinformation, and frustration for both parties to the communication. In addition, in some situations, the distraction caused by an incoming communication can be unsafe for the called party or others in the vicinity, e.g., when the called party is operating heavy machinery in a factory or at a construction site.

The ambient sound-based call functions provide a means to assess ambient noise levels surrounding a mobile communications device and use the results of this assessment to determine whether to connect a call (e.g., activating a ringtone signifying the incoming call) that is received at the mobile communications device. This process occurs automatically without any user input at the time of the call. The call functions provide a user interface that allows a user to configure various settings, such as selecting threshold noise levels that will trigger automated responses to callers, as well as selective overriding of the trigger based on a user's contacts list. By deferring the connection of calls in which a trigger has occurred, the call functions eliminate the problems and difficulties otherwise experienced when a user attempts to conduct a communication in a noisy environment. These and other features of the ambient sound-based call functions will now be described.

Figure 1:
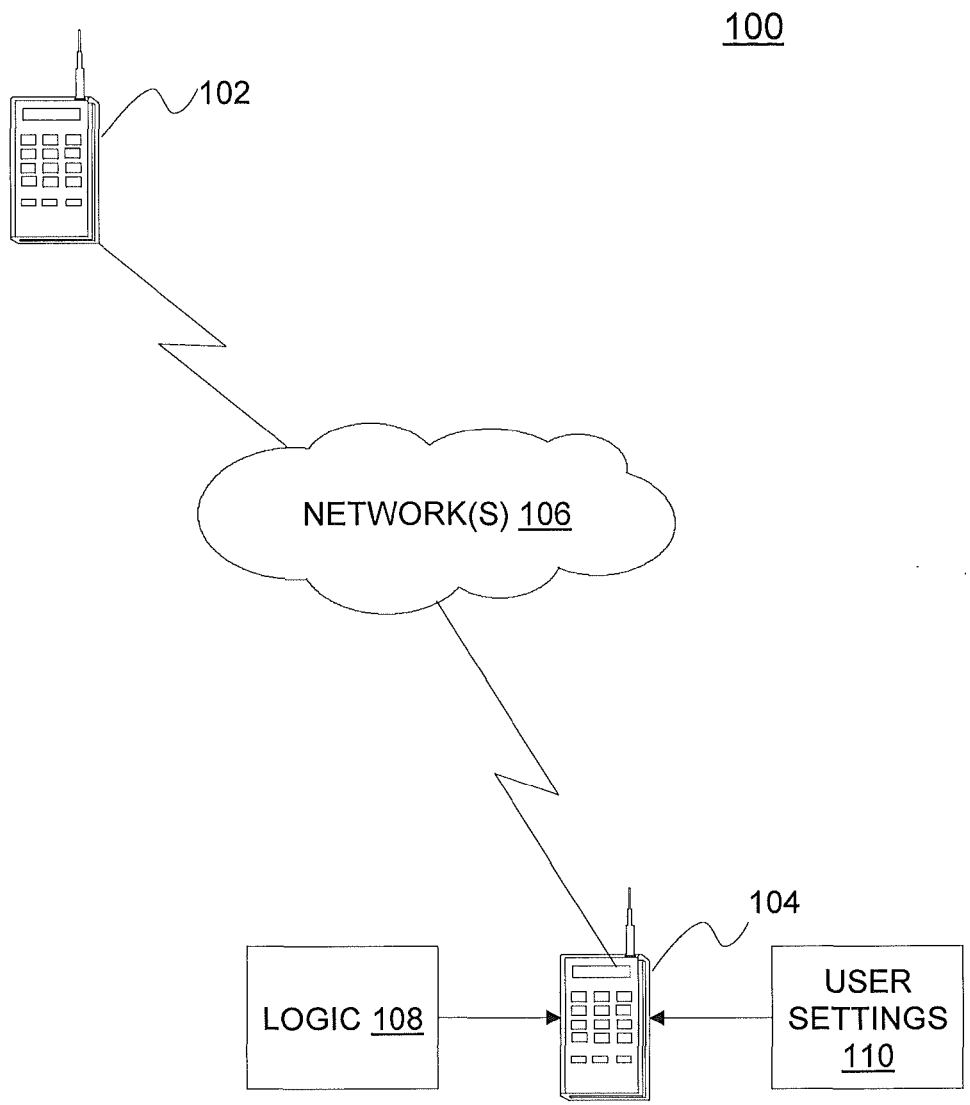
FIG. 1 depicts a block diagram of a system upon which ambient sound-based call functions may be implemented according to an embodiment of the present invention.

Turning now to FIG. 1, a system 100 upon which the ambient sound-based call functions (also referred to herein as "call functions") may be implemented will now be described in an exemplary embodiment. The system 100 of FIG. 1 includes mobile communications devices 102 and 104 in communication with one or more networks 106. For purposes of illustration, the mobile communications device 102 is described herein as a calling device, and the mobile communications device 104 is the called device, or the device that is called by the mobile communications device 102. The mobile communications devices 102 and 104 may be implemented as any portable, wireless communications device, such as a cellular telephone, smart phone, personal digital assistant, or tablet, to name a few. It will be understood that while only two mobile communications devices 102 and 104 are shown in FIG. 1, there may be any number of such devices employed in order to realize the advantages of the exemplary embodiments described herein. The mobile communications devices 102 and 104 may be implemented, in part, using computer processors operating in response to computer programs stored in a storage medium accessible by the processors.

The mobile communications device 104 includes logic 108 that is executable by the computer processor of the mobile communications device 104 for implementing the call functions described herein. In an exemplary embodiment, the logic 108 provides a user interface that allows a user of the mobile communications device 104 to configure settings 110 used by the logic 108. These settings are stored in a memory location of the mobile communications device 104.

The mobile communications device 104 includes a microphone (not shown) which is typically configured with communications devices to enable the receipt and communication of speech.

The networks 106 may include any type of known networks including, but not limited to, cellular, satellite, and terrestrial. The networks 106 may employ various technologies such as, but not limited to, global system for mobile communications (GSM), high speed packet access (HSPA), code division multiple access (CDMA). The networks 106 may include a wide area network (WAN), a local area network (LAN), a global network (e.g. Internet), a virtual private network (VPN), and an intranet. The networks 106 may be implemented using any kind of physical network implementation known in the art.

Figure 2:
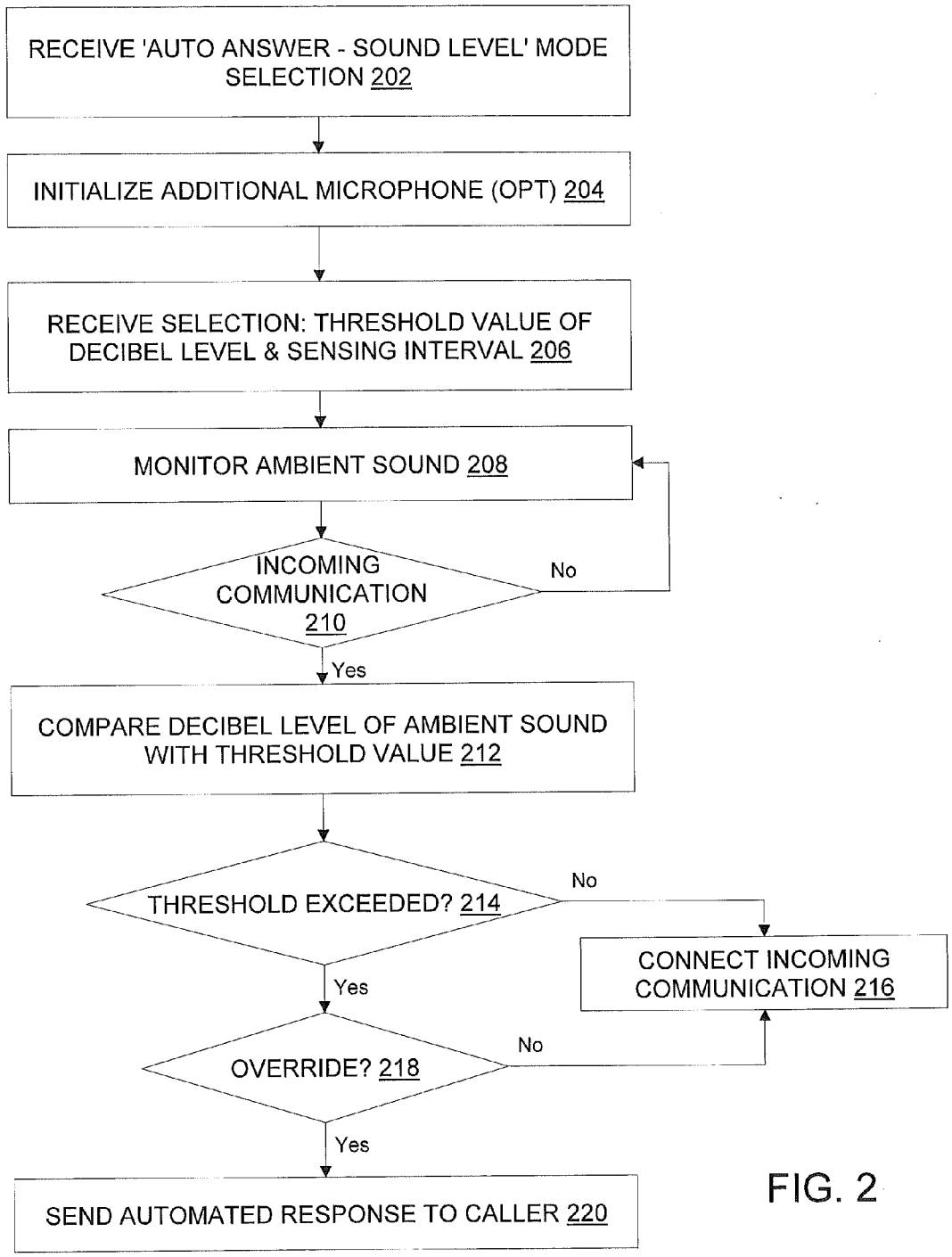
FIG. 2 depicts a flow diagram describing a process for implementing the ambient sound-based call functions according to an embodiment of the present invention.

Turning now to FIG. 2, a process for implementing the ambient sound-based call functions will now be described. The process described in FIG. 2 assumes that a user has powered on the mobile communications device 104. Steps 202-206 relate to a process for configuring the settings 110, and steps 208-220 relate to a process for implementing the settings 110 with respect to an incoming call.

The user has selected an 'auto answer' mode that is configured for the call functions, e.g., via an input or control option on the mobile communications device 104, and the mode selected is received by the logic 108 at step 202. A user interface screen 300 depicting this selection is shown in FIG. 3.

In an embodiment, the mobile communications device 104 may be equipped with an additional microphone that is specifically configured to monitor ambient sound with respect to the device 104. In this embodiment, the microphone is initialized at step 204. Alternatively, as indicated above, an existing microphone on the mobile communications device 104 may be used for this function.

At step 206, the logic 108 receives the user-selected settings. As shown in FIG. 3, when the user selects SETTINGS 302, a window 304 is displayed. The window 304 includes category items and approximate decibel ranges associated with each category item. This listing may be useful in assisting the user in relating a particular type of sound with its estimated sound level. As shown in FIG. 3, for example, a category item TRAIN 306 is estimated to have a sound level in the range of 70-80 decibels, while motor vehicle traffic (TRAFFIC) is estimated to have sound level in the range of 100 plus decibels. The user may utilize this listing in establishing personalized settings. For example, if the user commutes a long distance to work each day, the user may spend a great deal of time in traffic. The user may choose 100+ decibels for the settings, which is used by the logic 108 as a threshold value when determining when to connect incoming communications (voice calls and/or text messages) and when to respond to callers with an automated message.

Figure 3:
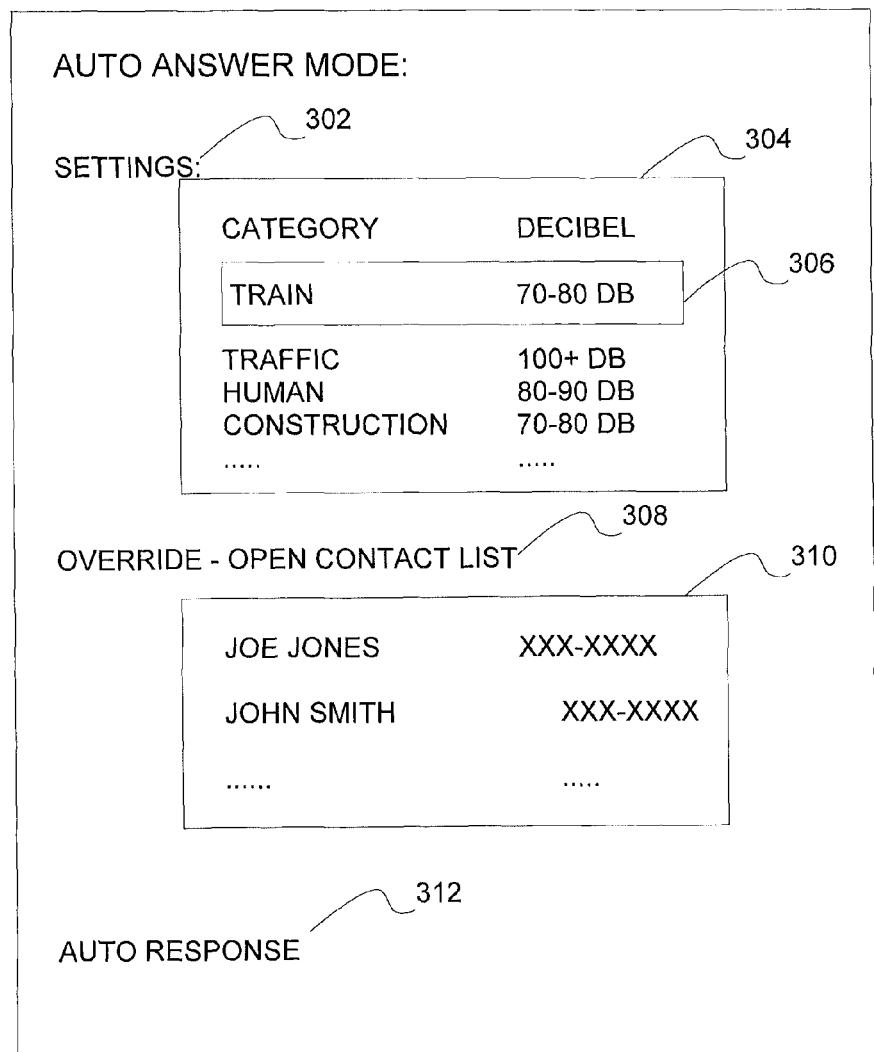
FIG. 3 depicts a user interface screen of a mobile communications device for implementing ambient sound-based call functions according to an embodiment of the present invention.

As shown in FIG. 3, by way of example, the user has selected TRAIN 306, which corresponds to 70-80 decibels.

The logic 108 uses this information (e.g., the lower value of 70, the higher value of 80, or an average between the low and high values as the threshold value. In an alternative embodiment, the listing of ranges may be replaced with other metrics that are commensurate with the decibel levels. By way of non-limiting example, a metric of 'low' may be associated with 60 decibels and below, a metric of 'medium' may be associated with decibels in the range of 61-80, and a metric of 'high' may be associated with decibels that exceed 80. The window 304 may depict the metrics 'low,' 'medium,' and 'high' in lieu of the range values.

In addition, the settings implemented through the user interface may include selecting a sensing interval (not shown). The sensing interval instructs the logic 108 to monitor the ambient noise for a short but sustained period of time with a break in the monitoring set at selected intervals. For example, the monitoring may be initiated every 5 minutes. The monitoring may be sustained for a period of time (e.g., 3-5 seconds) to ensure that the ambient noise is persistent and is not an anomaly.

Also as part of the settings, and the configuration thereof, the user interface enables the user to select a mode of operation for implementing automated responses that is used by the logic 108 when the threshold value has been met (and optionally, the user has not configured any override functions). The user selects AUTO RESPONSE 312 on the user interface screen 300, and a window 400 shown in FIG. 4 is displayed.

The user may select an ENABLED-FULL mode 402 or an ENABLED-PARTIAL mode 404. The functions configured through the ENABLED-FULL mode 402 are associated with situations that may be unsafe for the user should the user engage in a communication via the device 104 (e.g., while working with heavy equipment in a construction site). As part of the configuration settings, the user may select ENABLED-FULL mode 402, followed by selecting any or all of the corresponding options 406, 408, and 410. For example, the user may select 406, which causes the logic 108 to activate a voice recording function on the mobile communications device 104. The user then records a voice message. For example, the voice message may be "Hi, this is John. I'm currently somewhere that is so noisy I am not able to hold a conversation. Please leave a message and I'll get back to you once I'm in a place where it is quiet enough to talk."

Similarly, the user may create a text message by selecting the CREATE TEXT MESSAGE option 408. This causes the logic 108 to activate a text feature of the mobile communications device 104. These user-created messages from options 406 and 408 are stored in memory on the device 104. If desired, the user may select USE DEFAULT VOICE/TEXT 410, which causes the logic 108 to implement a pre-defined voice and text message. For example, a default text message may be "The person that you are trying to contact is in an environment where it would not be safe to conduct a conversation via text message. Your message and time have been recorded."

Figure 4:
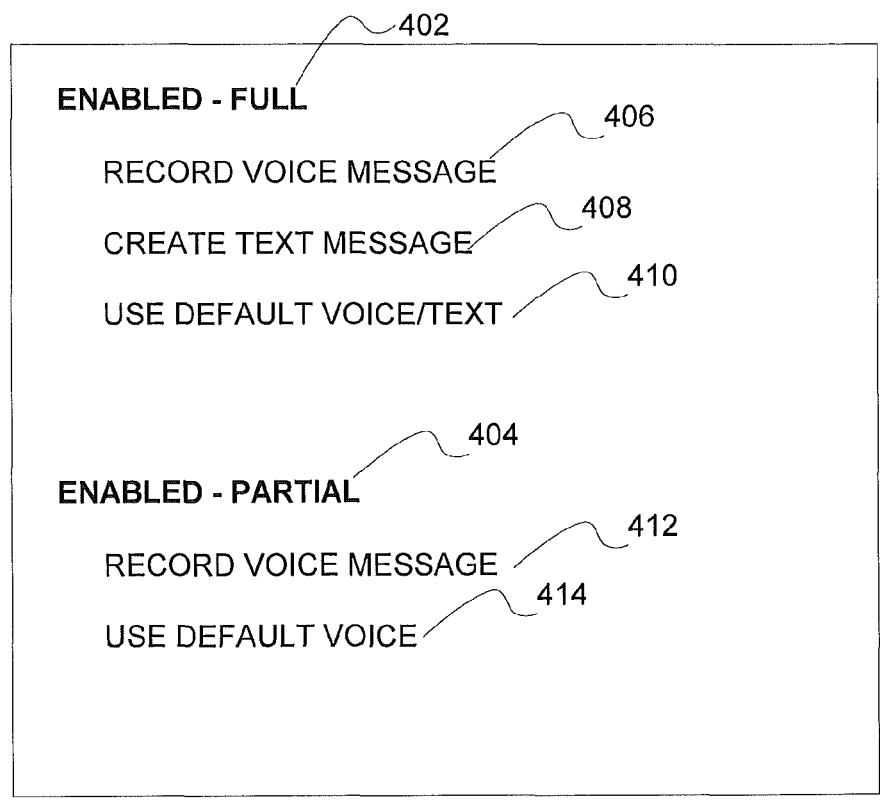
FIG. 4 depicts a user interface screen of a mobile communications device according to an embodiment of the present invention.

As shown in FIG. 4, another mode ENABLED-PARTIAL mode 404 may be configured by the user settings for situations in which it may be safe for the user to receive a text message, but it may not be safe for the user to engage in a voice communication with a calling party. By selecting ENABLED-PARTIAL mode 404, the user may select RECORD VOICE MESSAGE 412, which causes the logic 108 to activate a voice recording function on the mobile communications device 104. The user then records a voice message, which is stored in memory of the device 104. A sample voice message may be "Hi, this is John. I am currently somewhere that is so noisy I would not be able to hold a conversation. Please send me a text message instead or leave a message and I will get back to you once I am in a place where it is quiet enough to talk." Alternatively, the user may select USE DEFAULT VOICE option 414, in which the logic 108 presents a pre-defined voice recording to a calling party. Since text messages are permitted in this mode 404, no default text message is needed.

Another setting provided by the user interface includes an override feature. The override feature allows the user to implement the call functions for all contacts in the user's contact list (as well as calls from non-contacts) except for those specifically exempted by the user. As shown in FIG. 3, e.g., the user selects OVERRIDE-OPEN CONTACT LIST 308, and the logic 108 retrieves the user's contacts list and presents it in a window 310. The user selects one or more entries in the contacts list, and the logic 108 saves this information as part of the settings 110 in the mobile communications device 104.

The user interface screens 300 and 400 shown in FIGS. 3 and 4 are presented for purposes of illustration and are not to be considered as limiting in scope. It will be understood that modifications may be made to the user interface screens 300 and 400 in realizing the advantages of the exemplary embodiments. For example, the settings may be implemented out of order listed in the Figures, or may be depicted or arranged in any configuration desired.

Once these settings 110 have been selected by the user, the logic 108 is ready to implement the call functions for incoming calls. Returning to FIG. 2, at step 208, the logic 108 monitors the ambient sound through the device's 104 microphone using the sensing interval settings configured above. The logic 108 calculates a decibel level of the ambient sound. The calculation may be repeated over the time interval, and an averaged decibel level may be determined from this information.

At step 210, the logic 108 determines whether an incoming communication is detected by the mobile communications device 104. If not, the process returns to step 208 whereby the monitoring continues. If, however, an incoming communication is detected, and prior to connecting the incoming call or displaying an indicator of a text message (where the incoming communication is a text), the logic 108 retrieves the threshold value selected by the user and compares it with the calculated value at step 212. At step 214, the logic 108 determines whether the calculated decibel level exceeds the threshold value. If not, the logic 108 connects the incoming communication, or presents the indicator of the text message. Otherwise, the logic 108 determines whether the user has configured an override setting for the caller at step 218. This may be implemented, for example, by comparing the name or phone number of the incoming communication to the settings configured for the override feature.

At step 218, if the override feature has not been configured for this caller, the logic 108 connects the incoming communication (or presents the indicator of the text message) at step 216. Otherwise, the logic 108 retrieves the automated message configured by the user and sends the automated message to the caller at step 220.

The process described in FIG. 2 relates to the operation of the call functions with respect to the ENABLED-FULL mode 402. If the mobile communications device 104 is set to ENABLED-PARTIAL mode 404 instead of ENABLED-FULL, the logic 108, between steps 218 and 220, determines whether the incoming communication is a text message or voice call. If the incoming communication is a voice call, an automated voice response (via the RECORD VOICE MESSAGE 412 or USE DEFAULT VOICE 414) is presented to the caller. If the incoming communication is a text message, however, the logic 108 permits the text message to be displayed on the mobile communications device 104.

Technical effects of the invention include ambient sound-based call functions that enable a mobile communications device to assess ambient noise levels surrounding the mobile communications device and use the results of this assessment to determine whether to connect a call that is received at the mobile communications device. The call functions provide a user interface that allows a user to configure various settings, such as selecting threshold noise levels that will trigger automated responses to callers, as well as selective overriding of the trigger based on a user's contacts list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
   providing, via a user interface implemented by a computer processor on a mobile communications device, a list of categories and ranges of decibel levels associated with each item in the list, the categories representing real world sources of noise;
   receiving, from a user of the mobile communications device, an item from the list;
   calculating, via the computer processor, a decibel level of ambient noise with respect to the mobile communications device;
   in response to receiving an incoming call from a calling device, prior to activating a ringtone on the mobile communications device, and upon determining that the decibel level exceeds a threshold value, the threshold level indicative of one of the ranges of the decibel levels in the list corresponding to the item selected by the user, determining a mode of the mobile communications device, the mode being one of two modes;
   if the mode is a first mode, sending an automated response to the calling device in lieu of connecting the call to the mobile communications device; and
   if the mode is a second mode, determining whether the incoming call is a text message or a voice call;
   if the incoming call is the voice call, presenting an automated voice response to the calling device; and
   if the incoming call is the text message, present the text message on the mobile communications device.

2. The method of claim 1, further comprising:
prompting, via the user interface implemented on the mobile communications device, a user to configure a sensing interval; and
monitoring the decibel level according to the sensing interval configured by the user;
wherein the determining that the decibel level exceeds the threshold value is implemented in response to the monitoring.

3. The method of claim 1, further comprising:
prompting, via the user interface implemented on the mobile communications device, a user to configure the automated response, the automated response including one of a text message and a voice message.

4. The method of claim 3, further comprising:
accessing a contacts list of the mobile communications device;
wherein prompting the user to configure the automated response includes prompting the user to configure the automated response based on a selected item in the contacts list.

5. The method of claim 1, further comprising:
providing, via the user interface implemented on the mobile communications device, an override function;
receiving, a selection from a contacts list from a user; and
applying the override function to the selection, such that the ringtone of the mobile communications is activated when the incoming call is from the calling device indicating the selection.

6. A computer program product comprising a tangible computer-readable storage medium embodied with instructions, which when executed by a computer of a mobile communications device cause the computer to implement a method, the method comprising:
providing, to a user interface implemented on the mobile communications device, a list of categories and ranges of decibel levels associated with each item in the list, the categories representing real world sources of noise;
receiving, from a user of the mobile communications device, an item from the list;
calculating a decibel level of ambient noise with respect to the mobile communications device; and
in response to receiving an incoming call from a calling device, prior to activating a ringtone on the mobile communications device, and upon determining that the decibel level exceeds a threshold value, the threshold level indicative of one of the ranges of the decibel levels in the list corresponding to the item selected by the user, determining a mode of the mobile communications device, the mode being one of two modes;
if the mode is a first mode, sending an automated response to the calling device in lieu of connecting the call to the mobile communications device; and
if the mode is a second mode, determining whether the incoming call is a text message or a voice call;
if the incoming call is the voice call, presenting an automated voice response to the calling device; and
if the incoming call is the text message, present the text message on the mobile communications device.

7. The computer program product of claim 6, wherein the method further comprises:
prompting, via the user interface implemented on the mobile communications device, a user to configure a sensing interval; and
monitoring the decibel level according to the sensing interval configured by the user;
wherein the determining that the decibel level exceeds the threshold value is implemented in response to the monitoring.

8. The computer program product of claim 6, wherein the method further comprises:
prompting, via the user interface implemented on the mobile communications device, a user to configure the automated response, the automated response including one of a text message and a voice message.

9. The computer program product of claim 8, wherein the method further comprises:
accessing a contacts list of the mobile communications device;
wherein prompting the user to configure the automated response includes prompting the user to configure the automated response based on a selected item in the contacts list.

10. The computer program product of claim 6, wherein the method further comprises:
providing, via the user interface implemented on the mobile communications device, an override function;
receiving a selection from a contacts list from a user; and
applying the override function to the selection, such that the ringtone of the mobile communications device is activated when the incoming call is from the calling device indicating the selection.

11. A method, comprising:
providing, to a user interface implemented by a computer processor on a mobile communications device, a list of categories and ranges of decibel levels associated with each item in the list, the categories representing real world sources of noise;
receiving, from a user of the mobile communications device, an item from the list;
calculating, via the computer processor, a decibel level of ambient noise with respect to the mobile communications device; and
in response to receiving an incoming communication from a calling device and upon determining that the decibel level exceeds a threshold value, the threshold level indicative of one of the ranges of the decibel levels in the list corresponding to the item selected by the user, performing a function corresponding to user-defined settings indicative of a mode of operation;
wherein the mode of operation includes enabled-full mode, and the performing a function when in enabled-full mode includes, responsive to determining the incoming communication is one of a voice call and a text message, sending an automated response to the calling device in lieu of connecting the incoming communication to the mobile communications device; and
wherein the mode of operation includes enabled-partial mode, and the performing a function includes:
responsive to determining the incoming communication is a voice call, sending an automated response to the calling device in lieu of connecting the incoming voice call to the mobile communications device; and
responsive to determining the incoming communication is a text message, permitting an indicator of the text message to be displayed on the mobile communications device.

12. The method of claim 11, further comprising:
prompting, via the user interface implemented on the mobile communications device, a user to configure a sensing interval; and
monitoring the decibel level according to the sensing interval configured by the user;

wherein the determining that the decibel level exceeds the threshold value is implemented in response to the monitoring.

13. The method of claim 11, further comprising:
prompting, via the user interface implemented on the mobile communications device, a user to configure an automated response as the function.

14. The method of claim 13, further comprising:
accessing a contacts list of the mobile communications device;
wherein prompting the user to configure the automated response includes prompting the user to configure the automated response based on a selected item in the contacts list.

15. The method of claim 11, further comprising:
providing, via the user interface implemented on the mobile communications device, an override function;
receiving, a selection from a contacts list from a user; and
applying the override function to the selection, such that a ringtone of the mobile communications device is activated when the incoming communication is from the calling device indicating the selection.

* * * * *